(12) United States Patent
Salvarani et al.

(10) Patent No.: US 6,760,597 B2
(45) Date of Patent: Jul. 6, 2004

(54) POWER CONTROL METHOD FOR CDMA WIRELESS COMMUNICATION NETWORKS

(75) Inventors: Alexandro Salvarani, Edison, NJ (US); Carl Francis Weaver, Hanover Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 405 days.

(21) Appl. No.: 09/732,846

(22) Filed: Dec. 8, 2000

(65) Prior Publication Data

US 2002/0072385 A1 Jun. 13, 2002

(51) Int. Cl.[7] ................................................ H04B 7/00
(52) U.S. Cl. ........................ 455/522; 455/69; 455/442
(58) Field of Search ................................ 455/522, 561, 455/70, 442, 69, 436, 422, 574

(56) References Cited

U.S. PATENT DOCUMENTS

| | | | | |
|---|---|---|---|---|
| 5,884,187 A | * | 3/1999 | Ziv et al. ..................... | 455/522 |
| 6,119,018 A | * | 9/2000 | Kondo ........................ | 455/522 |
| 6,148,207 A | * | 11/2000 | Baum et al. ................. | 455/442 |
| 6,493,564 B2 | * | 12/2002 | Longoni et al. ............. | 455/522 |
| 2003/0153311 A1 | * | 8/2003 | Black ......................... | 455/436 |

FOREIGN PATENT DOCUMENTS

| | | | |
|---|---|---|---|
| EP | 0 940 932 A2 | 9/1999 | .......... H04B/7/005 |
| EP | 0 963 059 A2 | 12/1999 | .......... H04B/7/005 |

OTHER PUBLICATIONS

F. LIng et al., "Behavior And Performance Of Power Controlled IS–95 Reverse–Link Under Soft Handoff", Vehicular Technology Conference, 1997, IEEE 47th Phoenix, AZ, USA May 4–7, 1997, New York, NY, pp. 924–928.
European Search Report.
F. Ling, et al., "Behavior And Performance Of Power Controlled IS–95 Reverse–Link Under Soft Handoff", Vehicular Technology Conference, 1997, IEEE 47th Phoenix, AZ, May 1997, pp. 924–928, XP010228978.
European Search Report.

* cited by examiner

Primary Examiner—Nick Corsano
Assistant Examiner—Tan Trinh
(74) Attorney, Agent, or Firm—Ozer M. N. Teitelbaum; J. Milton

(57) ABSTRACT

A power control method for reverse links used in soft handoff mode between a mobile and base stations of a CDMA wireless communication network. Each of the base stations computes a setpoint based on the quality of received frames. The lowest setpoint value is then used as a threshold for inner loop operation causing at least one of the reverse links to convey information in compliance with a target FER set by the network.

23 Claims, 1 Drawing Sheet

```
┌─────────────────────────────────────────┐
│  SELECT LOWEST SETPOINT FROM A          │
│  GROUP OF SETPOINTS RECEIVED FROM       │
│  BASE STATIONS IN SOFT HANDOFF WITH A   │──── 100
│  MOBILE WHERE EACH SETPOINT IN THE      │
│  GROUP IS COMPUTED BY AN OUTER LOOP     │
│  POWER CONTROL SCHEME IMPLEMENTED       │
│  BY A CORRESPONDING BASE STATION        │
└─────────────────────────────────────────┘
                    │
                    │
┌─────────────────────────────────────────┐
│  TRANSFERING THE SELECTED SETPOINT TO   │
│     THE INNER LOOP POWER CONTROL        │──── 102
│  SCHEME OF EACH OF THE BASE STATIONS    │
│     IN SOFT HANDOFF WITH THE MOBILE     │
└─────────────────────────────────────────┘
```

POWER CONTROL METHOD FOR CDMA WIRELESS COMMUNICATION NETWORKS

BACKGROUND OF THE INVENTION

1. Field of the Invention

The present invention is generally related to a method of allocating power to subscriber and system equipment for transmission of information in CDMA communication networks.

2. Description of the Related Art

With the increasing popularity of wireless communication networks among the public, service providers want to provide more resources to their subscribers and be able to efficiently use the resources that are currently being used by their subscribers. The service providers are typically local or national telephone companies that own, operate and control system equipment that constitute a communication network. The resources of a communication network comprise such items as the amount of bandwidth available to the network, the power allocated to communication channels of the network and the transceiver system equipment (e.g., radio transmitters and receivers) used by the network to transmit and receive communication signals. Service providers want to increase the capacity of their network without having to substantially increase their cost of operation through increased power allocations, larger bandwidths and deployment of more system equipment. Moreover, the usage of certain resources (power, bandwidth) is controlled by governmental regulatory entities and standards organizations. Consequently, service providers cannot simply increase their power usage in response to increased capacity demands from their subscribers. Therefore, to achieve efficient use of their limited resources, service providers implement various techniques for controlling such resources as bandwidth and power allocation.

Power allocation is one of the resources that is controlled by service providers through the use of techniques that promote the efficient use of resources. In Code Division Multiple Access (CDMA) wireless communication networks, the power allocated to the communication channels is critical because power allocation is one of the major factors that determine the capacity of the network. The capacity of a communication network is the number of subscribers that is using a communication network to convey (i.e., transmit and/or receive) information at a particular time.

A typical wireless CDMA communication network is configured as a cellular network. The network comprises a plurality of cells where each cell contains at least one base station that conveys subscriber information to subscribers in the cell and signaling information to subscribers and other base stations. The cell is a geographical area being served by a base station where such cell is defined by a particular size and shape. Subscriber equipment (e.g., cell phone, wireless laptop, Personal Digital Assistant (PDA)) physically located in a cell convey information to other subscribers of the wireless network or other networks via the base station serving that cell. The terms 'subscriber equipment' and 'mobile' will hereinafter be used interchangeably.

Subscriber information are the various types of information (e.g., voice, data, video) conveyed by subscribers. Signaling information are various information conveyed among system equipment and between mobile and system equipment for initiating, maintaining and terminating communications between subscribers of the same or different networks. Each base station comprises various system equipment for processing communication signals. The communication channel through which a subscriber transmits information to a base station is commonly referred to as a reverse link. The communication channel through which a subscriber receives information from a base station is commonly referred to as a forward link.

In CDMA networks (and other networks), often when a mobile transmits information to its base station over the reverse link, the information is received by the intended base station and other base stations. The information is typically transmitted in the form of a block called a frame. Several base stations process the received frames by determining their quality, i.e., whether a frame contains errors; this scenario is called a soft handoff. Thus in a soft handoff the mobile's information is received and processed by more than one base station and the network takes advantage of the combined quality of the reverse links of the base stations to select a received frame from one of the base stations. The use of soft handoff thus tends to improve the Frame Error Rate (FER) of the mobile because if at least one frame has no errors, the frame selected is the one having no errors. A frame which is received with errors is an erroneous frame. The ratio of the number of erroneous frames received to the total number of frame received for a defined period of time is called the Frame Error Rate (FER). Any or all of the transmitted frames may be adversely affected by anomalies (e.g., fading, scattering) in the reverse links that cause errors to occur.

The FER is a parameter which is used by CDMA networks to implement power allocation techniques for controlling the amount of power used by a base station and a mobile in transmitting and/or receiving communication signals. A widely used technique is a power control method commonly referred to as directed power control. The directed power control method for a mobile in soft handoff contains two control loops called the outer loop and the inner loop. There is an outer loop for the reverse and forward links. Also, there is an inner loop for the reverse and forward links.

For a reverse link outer loop, each of the base stations in soft handoff with a mobile receives a frame and processes that frame to determine its quality. Each of the base station then transmits its received frame or information about the quality of the received frame to system equipment at the Message Switching Center (MSC) of the network. Each of the base stations will also determine a setpoint based on the quality of its received frame. The quality is typically quantified in terms of the FER of the received information. The setpoint is a power level at which the mobile should transmit its information in order to meet a target FER set by the communication network. The setpoint is defined in terms of a ratio of signal power (proportional to $E_b$) to noise power (proportional to $N_1$) at the mobile, i.e., $E_b/N_1$ where $E_b$ is the energy per information unit and $N_1$ is the noise power spectral density. If one or more of the received frames contains no errors, the MSC will then transmit a message to the base stations advising them that an errorless frame was received and to proceed with receiving the next frame. Each of the base stations, in turn, sends a message over its forward link to the mobile instructing the mobile to transmit its information at a power level that is less than the power level of the last frame. In other words, after receiving the instruction from the MSC, the base stations reduce the computed setpoint by a certain amount and transmit a new setpoint value to the mobile. Note that when all of the frames received contained errors, the MSC sends a message to the base stations advising each base station that its frame was erroneous causing each base station to increase its computed setpoint value. During the transmission of the next frame, the mobile will attempt to reduce (or increase) the power level of its communication signals to meet the new setpoint computed by the base stations; this is done by reverse the inner loop operation.

In the reverse inner loop, each of the base stations sends instructions to the mobile instructing the mobile to decrease (or increase or maintain) its transmission power level while the frame is being transmitted to comply with the new setpoint computed by the base stations. For example, many CDMA networks have 20 ms frames during which each base station transmits 16 inner loop instructions (one instruction every 1.25 ms) causing the mobile to increase, decrease or maintain the power level at which it is transmitting its frame. In particular, after computing a new setpoint, a base station sends commands (over the forward link) to the mobile. During the transmission of the next frame, the mobile responds to a command received from a base station by adjusting appropriately the transmission level of the frame. The base station measures the level at which it is receiving the frame and sends another command to the mobile to either increase, decrease or maintain the transmission level; this procedure is repeated several time (e.g., 16 times) during the transmission of the next frame in an attempt to have the mobile transmit information at the new setpoint power level. Therefore, the outer loop is responsible for adjusting the setpoint for a mobile while the inner loop is responsible for keeping the mobile's transmission level as close to the adjusted setpoint as possible.

A major problem with the directed power control method (for reverse links) is that the FER for some of the reverse links may be unacceptably high preventing the corresponding base stations from successfully receiving other information (e.g., forward link power control information) over these links. The directed power control method adjusts the setpoint based on the best frame received ignoring the FER of the individual reverse links. Typically, the communication network imposes a target FER on its reverse (or forward) links. For example, for a mobile in 3-way soft handoff with equal path losses and in a communication network having a target FER of 1% for its combined reverse links, information received by each of the three base stations will have an FER of 21%. The path losses relate to the amount of degradation suffered by the frames after having propagated over the reverse link. Thus, even when the reverse link target FER is met, none of the individual reverse links being used in the soft handoff meets the target FER. In sum, the directed power control method used for reverse link soft handoff situations does not guarantee that at least one of the reverse links is reliable.

When the reverse link is used to transmit forward power control information from the mobile to a base station, the degradation of the individual link FER due to reverse loop operation has a significant adverse effect on the forward power control information. The forward power control information is information transmitted from the mobile to the base station instructing the base station as to the proper transmission power level of frames transmitted over the forward link by the base station. When the base station receives erroneous forward link power control information it cannot properly adjust its transmission power level and thus the forward link capacity is adversely affected. Power control operation for the forward link is also adversely affected.

A particular application of the directed power control method uses a reverse pilot signal to transmit both power control measurements (used for reverse link power measurements during reverse inner loop operation) and forward link power control commands over the reverse link. As explained above, the particular reverse link may be adversely affected to such an extent that the information transmitted with the use of the pilot signal becomes unreliable. One way to mitigate this problem is to increase the power of the reverse pilot signal for all of the reverse links of a soft handoff thus improving the performance of the power control for the forward link. However, such an increase in power for the reverse pilot signal causes the reverse link capacity to decrease because the pilot signal power level overwhelms the information being transmitted over the reverse links. Further, some of the reverse links may be operating at the target FER making an increase in the pilot signal unnecessary thus defeating the goal of efficient power usage.

What is therefore needed is a power control method for mobiles in soft handoff that allows at least one of the links to be reliable (i.e., complies with target FER) without adversely affecting power control information being conveyed over the at least one reliable link.

SUMMARY OF THE INVENTION

The present invention is a method for implementing power control in a communication network for at least one link being used by a mobile and base stations in soft handoff mode. At least one of the links being used in the soft handoff mode is operated at a quality imposed by the network without adversely affecting power control information being conveyed over the at least one link.

In particular the method of the present invention comprises the following steps: first, selecting the lowest setpoint from a group of setpoints received from the base stations in soft handoff with a mobile is selected. Each of the setpoints in the group is computed by outer loop power operations performed by each one of the base stations in soft handoff mode with the mobile. Second, regardless of the particular setpoint computed by each base station, the selected setpoint is used as a threshold for inner loop operations performed by all of the base stations in soft handoff with the mobile. Therefore, the method of the present invention will adaptively correct the power level of information over the link so that at least one link (i.e., the best link or the link with the lowest path loss) being used in the soft handoff connection will comply with any quality requirements being imposed by the network.

DETAILED DESCRIPTION

Figure 1:
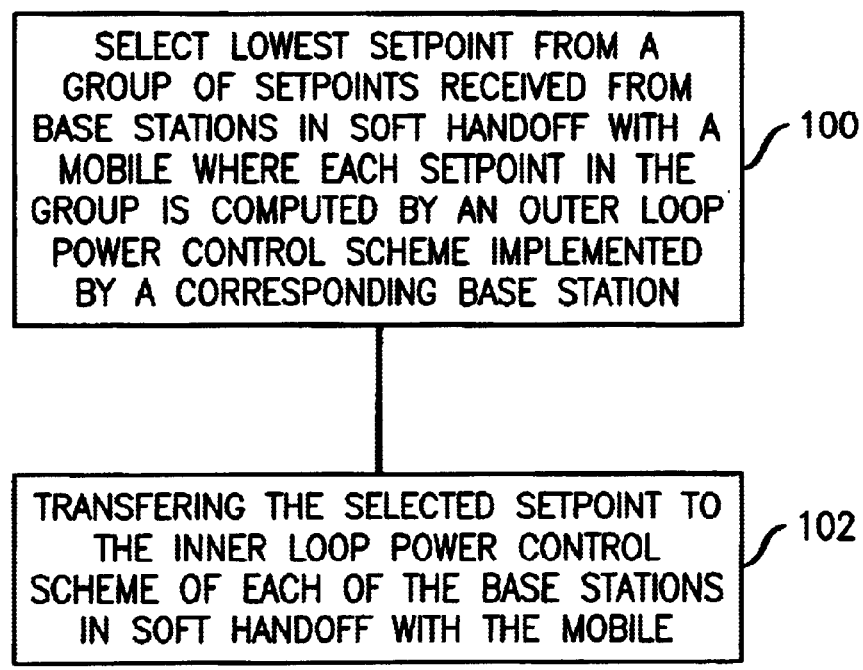
FIG. 1 depicts a flowchart of the method of the present invention.

The present invention is a method for implementing power control in a communication network for at least one link being used by a mobile and base stations in soft handoff mode. At least one of the links being used in the soft handoff mode is operated at a quality imposed by the network without adversely affecting power control information being conveyed over the at least one link.

In particular the method of the present invention comprises the following steps: first, selecting the lowest setpoint from a group of setpoints received from the base stations in soft handoff with a mobile is selected. Each of the setpoints in the group is computed by outer loop power operations performed by each one of the base stations in soft handoff mode with the mobile. Second, regardless of the particular setpoint computed by each base station, the selected setpoint is used as a threshold for inner loop operations performed by all of the base stations in soft handoff with the mobile. Therefore, the method of the present invention will adaptively correct the power level of information over the link so that at least one link being used in the soft handoff connection will comply with any quality requirements being imposed by the network.

For ease of explanation, the method of the present invention will be explained in the context of power control of reverse links for a mobile in 3-way soft handoff mode in a CDMA communication network; that is, a mobile in communication with three base stations. It will be readily understood that the method of the present invention is not limited to any particular number of base stations in the soft handoff mode. Initially, each of the base station is operating an outer loop with an established setpoint. In general, the mobile may be in soft handoff with N base stations where N is an integer equal to 2 or greater. The manner in which the base stations compute the setpoints and the specific value of the setpoints are particulars that depend on various factors affecting the network and the configuration of the network; the method of the present invention operates independently of these factors.

Referring to FIG. 1, in step 100 a mobile, which has been given access to the communication network and is in 3-way soft handoff, transmits a frame that is received by three base stations. Each of the base stations performs its respective outer loop operation, viz., computing a setpoint value after having processed the received frame to determine its quality. Typically, the quality of the frame is expressed in terms of its information error rate which is the ratio of the number of erroneous information blocks received to the total number of information blocks received for a defined period of time. For example, the information error rate can be represented by the FER for CDMA networks in which information is conveyed in the form of frames. Each of the base stations transfers its computed setpoint to system equipment performing the method of the present invention, i.e., Minimum Setpoint (MS) module. The MS may, for example, be implemented with a server or a microprocessor based circuit or other type of programmable computer. The MS selects the setpoint having the lowest value from the group of setpoints received from the base stations. The base stations also transfer either the received frames or information about the quality of the received frames to the MSC. When the base station transfers information about the quality of the received frames to the MSC, the outer loop operation is performed by the MSC. When the MSC performs the outer loop operation, it first computes a setpoint for each of the received frames and selects the lowest setpoint from the group of computed setpoints. Information concerning the quality of frames conveyed over the reverse links between the base station and the mobile can be used at either the MSC or the base stations to compute the setpoints. Thus, the outer loop operation can be performed at either the MSC or at the base stations. As in the prior art, the MSC advises the base stations as to whether an errorless frame was received. Accordingly, the base stations will update (i.e., either increase or decrease) their current setpoint values. Thus, the modification of setpoints based on the quality of received frames, is still be performed by the base stations.

In step 102, the MS transfers the selected setpoint to the base stations instructing each of the base stations to use the selected setpoint as the threshold for their inner loop operation. Thus, each of the base stations will transmit commands to the mobile during the transmission of the next frame directing the mobile to transmit its information at the selected setpoint power level. The mobile will increase its transmission power level if all of the commands instruct it to increase its power. The mobile will decrease its transmission power level if any one of the commands instructs it to do so. Note that the base station whose outer loop setpoint value was selected as the lowest setpoint value will be using the threshold that will cause the reverse link corresponding to that base station to approach the quality requirement (e.g., target FER) imposed by the network. In this manner, at least one of the reverse links in the 3-way soft handoff will approach the network's link quality requirement; also other information can be reliably conveyed over that link during the transmission of the next frame since its inner loop operation matches its outer loop operation. The other two links have inner loop operations during the transmission of the next frame that are incompatible with their outer loop operations; that is the power level at which the mobile is being directed to transmit information by the inner loops of the other two links does not match the outer loop setpoint values of these links. The inner loop setpoint value may or may not be sufficient to allow reliable conveyance of information (e.g., power control information and frames) over these other two links. However, for each frame being transmitted at least one link will be able to convey information at an FER that complies with the target FER of the communication network.

In another embodiment of the method of the present invention, both steps 100 and 102 are performed at one location (e.g., the MSC or one of the base stations) containing system equipment having characteristics and capabilities as described above. For example, the processing of received frames and computation of setpoints for each link based on the received frame can be done at an MSC or some other location in the network containing system equipment having access to received frames or having access to information describing quality of received frames.

It will be readily understood that the method of the present invention applies not only to CDMA networks but also applies to other communication networks where all information is conveyed in one frequency range, e.g., spread spectrum communication networks and certain TDMA networks.

We claim:

1. A method for implementing power control between subscriber equipment and system equipment of a communication network, the method comprises the steps of:

selecting a setpoint having the lowest value from a group of setpoints computed independently by base stations as a function of signal quality at said base stations used for distinct communications channels of the network; and using the selected setpoint as a threshold reference setpoint to control transmission power levels of information conveyed in said communication channels of said communication network.

2. The method of claim 1 where the setpoints are computed based on quality of the information received over the communication channel.

3. The method of claim 2 where the communication network is a CDMA communication network and the communication channels are reverse links being used in a soft handoff mode between a mobile and N base stations where N is an integer equal to 2 or greater.

4. The method of claim 1 where the step of using the selected setpoint as the threshold reference setpoint to control transmission power levels comprises:

transferring the selected setpoint with said lowest value to each base station, and instructing each said base station to use said selected setpoint as said threshold reference setpoint in an inner-loop operation in soft handoff wherein each said base station and a mobile are part of a CDMA communications network.

5. The method of claim 4 further comprising sending a power level control command from each said base station to said mobile, wherein said power level control command is based on a comparison of said threshold reference setpoint and signal quality measurement, and wherein said mobile increases its power level if all of the commands from each said base station instruct it to increase power and wherein said mobile decreases its power level if any one of said commands from each said base station instructs it to decrease power.

6. A method for implementing power control for at least one reverse link being used in a soft handoff mode between a mobile and base stations of a CDMA communication network, the method comprises the steps of:

selecting a setpoint having the lowest value from a group of setpoints each of which is computed by one of the base stations as a function of signal quality at said base stations through an outer loop operation; and transferring the selected setpoint to the base stations for use as a threshold reference setpoint for decisions on power level control commands during inner loop operations of each of said base stations.

7. The method of claim 6 where the step of selecting a setpoint having a lowest value is performed at an MSC of the CDMA communication network.

8. The method of claim 6 where the step of selecting a setpoint having a lowest value is based on the setpoint at one of the base stations in soft handoff mode.

9. The method of claim 6 where there are N base stations in soft handoff with the mobile where N is an integer equal to 2 or greater.

10. The method of claim 6 where the steps of selecting a setpoint and transferring the setpoint to the base stations are performed by a server or a microprocessor based circuit or a programmable computer located at an MSC or at one of the base stations of the communication network.

11. The method of claim 6 where the setpoints are computed either at one of the base stations or at an MSC.

12. The method of claim 6 where information concerning quality of information conveyed between the base station and the mobile over the reverse link is used at either the MSC or at the base stations to compute the setpoints.

13. A method for use in a wireless communication network comprising at least two base stations in communication with a mobile station, the method comprising the steps, performed by each of said base stations, of a) transmitting a command to said mobile station to increase or decrease its transmit power as a function of the results of a comparison between 1) a threshold reference setpoint and 2) a measured quantity that is a function of the power of the signal received by said each base station from the mobile station, b) repeating step a) a predetermined number of times, c) establishing the value of a setpoint based on the quality of the signal received from said mobile station, d) obtaining an updated threshold reference setpoint that is the smallest of the local setpoints established by each of said base stations in step c), e) repeating steps a) through d).

14. The method of claim 13 wherein the setpoint value establishing step comprises adjusting the present value of said setpoint upwards if said signal received from the mobile station after the last of said commands was transmitted contained at least one error and adjusting the present value of said setpoint downwards if said signal received from the mobile station after the last of said commands was transmitted did not contain errors.

15. The method of claim 14 wherein said measured quantity is a signal-to-noise ratio.

16. The method of claim 13 wherein in said command transmitting step said mobile station is commanded to increase its transmit power if said measured quantity is less than said threshold reference setpoint and to decrease its transmit power if said measured quantity is greater than said threshold reference setpoint.

17. The method of claim 16 wherein said entity is a mobile switching center.

18. The method of claim 13 wherein said obtaining an updated threshold reference comprises each of said base stations transmitting said established setpoint value to a particular network entity and receiving said smallest setpoint from said entity.

19. A method for use in a wireless communication system in which a mobile station is concurrently in communication with a plurality of base stations, the method comprising the steps, performed at each base station, of repetitively updating a setpoint in response to a succession of measurements of the quality of the signal received by said each base station from the mobile station, and transmitting a sequence of power control commands to the mobile station, each said power control command being a function of a comparison between a respective measure of the power of said received signal and one of a succession of threshold reference setpoints, each threshold reference setpoint being a selected one of the setpoints then being maintained at the plurality of base stations.

20. The invention of claim 19 wherein in said updating step, said base station maintained setpoint is decreased if said received signal satisfies a predetermined quality criterion and is increased if said received signal does not satisfy said predetermined quality criterion, and wherein in said transmitting step, the power control command is for the mobile station to increase its power if said power measure is less than said threshold reference setpoint and to decrease its power if said power measure is greater than said threshold reference setpoint.

21. The invention of claim 20 wherein said selected setpoint is the smallest of said setpoints then being maintained at the plurality of base stations.

22. The invention of claim 21 wherein said measure of the power of said received signal is a signal-to-noise ratio of said received signal.

23. The invention of claim 21 wherein the same threshold reference setpoint is used for a successive number of the comparisons carried out in said transmitting step.

* * * * *